(12) United States Patent
Hirata et al.

(10) Patent No.: US 7,009,766 B2
(45) Date of Patent: Mar. 7, 2006

(54) TRANSMISSIVE SCREEN AND REAR PROJECTION TYPE IMAGE DISPLAY APPARATUS USING SAME

(75) Inventors: Koji Hirata, Yokohama (JP); Akinori Maeda, Yokohama (JP); Nobuo Masuoka, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/779,253

(22) Filed: Feb. 13, 2004

(65) Prior Publication Data

US 2004/0257651 A1    Dec. 23, 2004

(30) Foreign Application Priority Data

Jun. 20, 2003    (JP)    ............................. 2003-175687

(51) Int. Cl.
G03B 21/60    (2006.01)

(52) U.S. Cl. ...................................... 359/455; 359/457
(58) Field of Classification Search ........ 359/452–453, 359/455–457
See application file for complete search history.

(56) References Cited

U.S. PATENT DOCUMENTS 5,745,288 A * 4/1998 Miyata et al. .............. 359/457
6,466,368 B1 * 10/2002 Piepel et al. ................ 359/456
6,862,139 B1 * 3/2005 Chang et al. ............... 359/453
2004/0240055 A1 * 12/2004 Teramoto et al. ........... 359/457

FOREIGN PATENT DOCUMENTS

| JP | 10-301208 | 11/1998 |
| JP | 2000-112035 | 4/2000 |
| JP | 2002-236319 | 8/2002 |

* cited by examiner

*Primary Examiner*—Christopher Mahoney
(74) *Attorney, Agent, or Firm*—Townsend and Townsend and Crew LLP

(57) ABSTRACT

An purpose of the present invention is to provide a simple configuration for bonding a lenticular lens sheet, a front sheet, and light diffusion layers together to reduce cost.

To accomplish the above purpose, the present invention comprises: a lenticular lens sheet (20); a front sheet (30); a first adhesive layer (35) for bonding the lenticular lens sheet (20) and the front sheet (30) together, the first adhesive layer (35) being disposed between the lenticular lens sheet (20) and a light incident side of the front sheet (30); an AR film (40); and a second adhesive layer (36) for bonding the front sheet (30) and the AR film (40) together, the second adhesive layer (36) being disposed between a light exit side of the front sheet (30) and the AR film (40); wherein light diffusion materials are spread in the first and second adhesive layers to add a light diffusion function to the layers.

10 Claims, 3 Drawing Sheets

TRANSMISSIVE SCREEN AND REAR PROJECTION TYPE IMAGE DISPLAY APPARATUS USING SAME

BACKGROUND OF THE INVENTION

The present invention relates to a transmissive screen for receiving a display image enlarged and projected from display elements, and to a rear projection type image display apparatus (hereinafter referred to simply as a PTV) using the transmissive screen.

As is well known, a transmissive screen for a PTV includes a light diffusion layer(s) in which a granular light diffusion material is spread in order to increase the viewing angles in the horizontal and vertical directions. PTVs using as their display elements a fixed pixel device, such as a liquid crystal panel or a micro-mirror panel, employ a projection lens having a small projection pupil size, which causes a scintillation disturbance (also referred to as a speckle disturbance) or "hot bars" to occur. A scintillation disturbance is a "flicker" produced due to interference between the light diffusion material within the light diffusion layer and the light, while "hot bars" refers to light strips appearing in the direction in which the lenticular lenses are arranged. Configurations for reducing the occurrence of these phenomena are described in Japanese Patent Laid-Open Publication No. 2002-236319 (hereinafter referred to as Patent Document 1) and Japanese Patent Laid-Open Publication No. 10-301208 (1998) (hereinafter referred to as Patent Document 2).

The configuration for reducing the above scintillation disturbance or "hot bars" disclosed in FIG. 1 of Patent Document 1 is such that: a light diffusion layer is provided on a Fresnel lens sheet having a Fresnel lens formed on its light exit surface; as a front sheet, a transparent resin substrate is disposed on the light exit side of a lenticular lens sheet having lenticular lenses on its light incident side; and two or more light diffusion layers each having a light diffusion material therein at a different dispersion density are laminated on the light exit side of the transparent resin substrate. The configuration disclosed in FIG. 1 of Patent Document 2, on the other hand, is such that two light diffusion layers are each laminated on a respective one of the light incident and light exit sides of a resin layer (acting as the front sheet) disposed on the light exit side of a lenticular lens sheet.

SUMMARY OF THE INVENTION

Displaying a finer image on a transmissive screen requires reducing the lens pitch of the lenticular lenses, making it necessary to reduce the thickness of the lenticular lens sheet. This leads to a reduction in the mechanical strength of the lenticular lens sheet. To prevent the reduction of the mechanical strength, conventionally the lenticular lens sheet and the front sheet are bonded together to enhance the mechanical strength. In the configurations disclosed in Patent Documents 1 and 2, the lenticular lens sheet and the front sheet are bonded together to make a composite sheet, and furthermore two light diffusion layers are bonded to the composite sheet, thereby increasing the viewing angles and reducing the occurrence of the scintillation disturbance, "hot bars", etc. while enhancing the mechanical strength. However, since there are at least four sheets in Patent Documents 1 and 2, such as the lenticular lens sheet, the front sheet, and the two light diffusion layers, are bonded to one another by adhesive, etc., a complicated structure results, making it difficult to reduce the cost.

Furthermore, since the above four sheets are bonded together by adhesive, etc, adhesive layers are newly formed between these sheets (at the interfaces between them). Accordingly, the configuration of Patent Document 2, for example, includes a total of 6 interfaces: those between the lenticular lens sheet and a first adhesive layer, between the first adhesive layer and a first light diffusion layer, between the first light diffusion layer and a second adhesive layer, between the second adhesive layer and the front sheet (resin layer), between the front sheet and a third adhesive layer, and between the third adhesive layer and a second diffusion layer. As the number of interfaces increases (as described above), so does the total light reflection level from them, resulting in large reflection loss and hence reduced contrast. This problem worsens when the refractive indices of the adhesive layers (adhesives) are considerably larger than that of the base material of the lenticular lens sheet, the front sheet, or the light diffusion layers.

Therefore, when two or more light diffusion layers are bonded to the front sheet and the lenticular lens sheet to reduce a scintillation disturbance, etc. while increasing the viewing angles, it is desirable to simplify the structure as well as to prevent an increase in the reflection loss and a reduction in the contrast.

Further, in the configuration of Patent Document 1, light diffusion layers are provided on both the Fresnel lens sheet and the lenticular lens sheet. The Fresnel lens sheet and the lenticular lens sheet are fixed to the screen frame. In this case, gaps might be formed between the sheets since each component material a different magnitude of expansion or contraction as the ambient temperature or humidity changes. If the gaps are formed, the distance between the light diffusion materials (layers) might vary at each position on a surface of the Fresnel lens sheet or the lenticular lens sheet, reducing the resolution of some portions of the screen (blurring them).

The present invention has been devised in view of the above problems. It is, therefore, a first purpose of the present invention to provide a simple configuration capable of enhancing the strength of the lenticular lens sheet while increasing the viewing angles. A second purpose of the present invention is to provide a simple configuration capable of enhancing the strength of the lenticular lens sheet as well as reducing the scintillation disturbance while preventing an increase in the reflection loss and a reduction in the contrast. A third purpose of the present invention is to provide a configuration capable of preventing a reduction in the resolution due to the fact that each component material exhibits a different magnitude of expansion or contraction as the ambient temperature or humidity changes.

To accomplish the above first purpose, a transmissive screen of the present invention comprises: a lenticular lens sheet; a front sheet; and a bonding layer (adhesive layer) for bonding the lenticular lens sheet and the front sheet together; wherein a light diffusion material for diffusing light is spread within the adhesive layer so that the adhesive layer is used as a light diffusion layer.

With the above arrangement, the adhesive layer can be used as a light diffusion layer having a light diffusion function (that is, the present invention allows the adhesive layer for bonding the lenticular lens sheet and the front sheet together to be also used as a light diffusion layer for diffusing light). Therefore, no bonding material such as an adhesive is needed (except for the light diffusion layer functioning as an adhesive layer) to bond the lenticular lens sheet, the front sheet, and the light diffusion layer itself together, making it possible to form a simple composite sheet configuration while increasing the viewing angles, and thereby reduce cost. Furthermore, since no adhesive is used (except for the light diffusion layer functioning as an adhesive layer) to bond the sheets together, adhesive layers are not formed between the lenticular lens sheet and the light diffusion layer and between the front sheet and the light diffusion layer, preventing an increase in the total reflection level from the interfaces due to the formation of the new adhesive layers.

To accomplish the second purpose, another transmissive screen of the present invention comprises: a lenticular lens sheet; a front sheet; a first adhesive layer disposed between the lenticular lens sheet and the front sheet and having a light diffusion function; and a second adhesive layer disposed on a light exit side of the front sheet and having a light diffusion function; wherein at least the first adhesive layer bonds the lenticular lens sheet and the front sheet together.

Thus, the first adhesive layer and the second adhesive layer each having a light diffusion function are disposed with the front sheet therebetween. That is, they are spaced a certain distance from each other, widening the light diffusion range. This results in increased diffusion effect, making it possible to reduce the above scintillation disturbance. Further, since the present invention uses the above first and second adhesive layers as the first and second diffusion layers, no additional adhesive is needed to bond the lenticular lens sheet, the front sheet, and even an antireflective film together, providing a simple composite sheet configuration. This leads to reduce cost. Furthermore, since no additional adhesive is needed to bond the sheets together, as described above, adhesive layers are not formed between the sheets such as the lenticular lens sheet, the front sheet, and the first and second light diffusion layers, reducing the number of interfaces of the composite sheet (the configuration of the present invention includes only 3 interfaces whereas that of Patent Document 1 includes 6 interfaces). Therefore, the total reflection level from the interfaces can be reduced, preventing an increase in the reflection loss and a reduction in the contrast.

Still further, according to the present invention, two light diffusion layers are each disposed on a respective side of the front sheet. Therefore, even if gaps are formed between the components due to expansion or contraction of each sheet attributed to changes in the ambient temperature or humidity, the first and second light diffusion layers are deformed in the same manner as the front sheet. That is, even when the expansion or contraction of the above sheets has occurred, the distance between the first and second diffusion layers is substantially the same at each position on the screen, making it possible to prevent a reduction in the resolution. Thus, the above configuration can also accomplish the third purpose.

DETAILED DESCRIPTION OF THE PREFERRED EMBODIMENTS

A preferred embodiment of the present invention will be described below with reference to the accompanying drawings. It should be noted that in the figures throughout this specification, the components having like functions are denoted by like numerals and described only once to avoid undue repetition.

Figure 1:
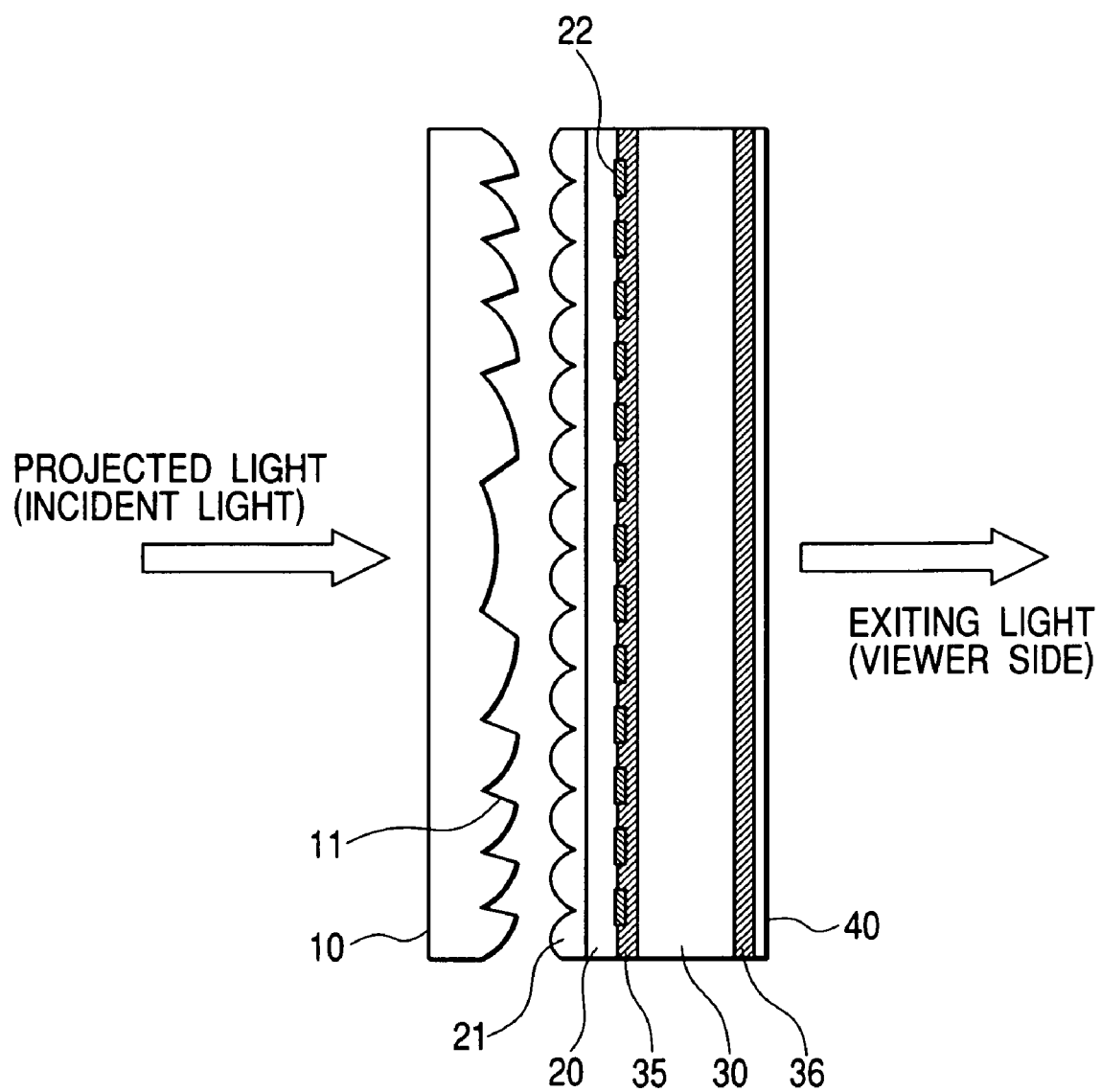
FIG. 1 is a schematic diagram showing a transmissive screen according to an embodiment of the present invention.
Figure 2:
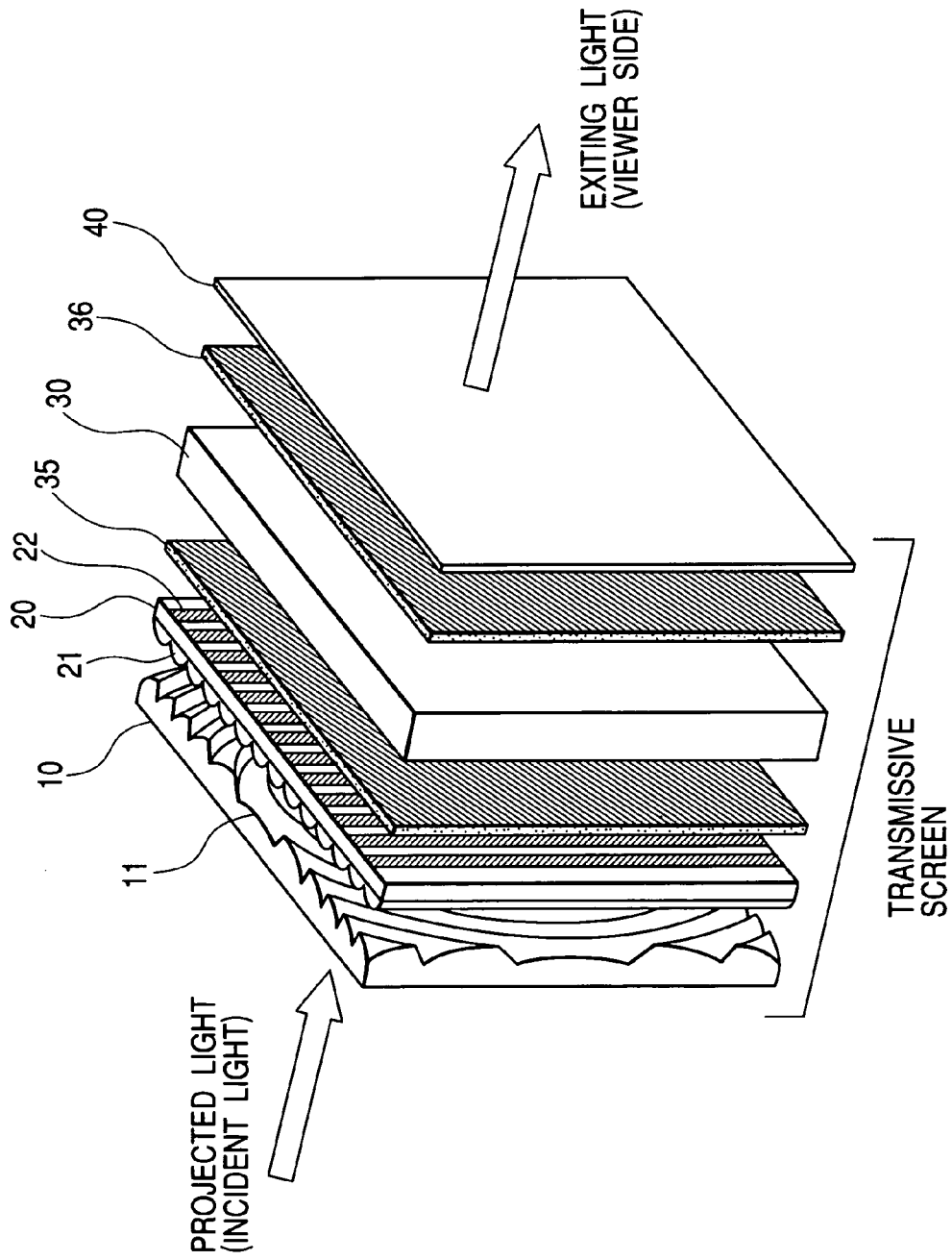
FIG. 2 is an exploded perspective view of the transmissive screen of FIG. 1.

FIG. 1 is a schematic diagram showing a transmissive screen according to an embodiment of the present invention, providing a horizontal cross section of the screen as viewed in the vertical direction. FIG. 2 is an exploded perspective view of the transmissive screen. Referring to these figures, the transmissive screen of the present invention comprises a Fresnel lens sheet 10, a lenticular lens sheet 20, a first adhesive layer (first light diffusion layer) 35, a front sheet 30, a second adhesive layer (second light diffusion layer) 36, and an AR film 40 arranged in that order in the light projection direction, that is, the traveling direction of the optical image.

The Fresnel lens sheet 10 has a concentric Fresnel lens 11 formed on its light exit side. The lenticular lens sheet 20 has a plurality of lenticular lenses 21 formed on its light projection (light incident) side. These lenticular lenses 21 are cylindrical lenses which extend in the vertical direction of the screen (their length is longer than their width) and are sequentially disposed in the horizontal direction of the screen to increase the viewing angle in that direction. On the light exit side of the lenticular lens sheet 20, on the other hand, a planar transmissive portion is formed at the focal position of each lenticular lens 21 (that is, at each light focusing portion). Furthermore, a black light-shielding layer (black stripe) 22 is formed at a position corresponding to each of the boundaries between the lenticular lenses 21 (that is, at each non-light-focusing portion). The black stripes are used to absorb ambient light and thereby enhance the contrast. The light transmissive portions and the light shielding layers are alternately disposed on the light exit surface of the lenticular lens sheet 20 in the horizontal direction of the screen. The front sheet 30 is a protective plate made of a translucent resin and having a width of between 2 and 3 mm. The front sheet 30 protects the lenticular lens sheet 20. The AR film 40 is a film on which is formed an antireflective film for preventing reflection of ambient light from the viewer side. The first adhesive layer (sometimes called the first diffusion layer) 35 is used to bond the lenticular lens sheet 20 and the front sheet 30 together so as to fix them in place, and made of an adhesive material. The second adhesive layer (sometimes called the second diffusion layer) 36, on the other hand, is used to bond the front sheet 30 and the AR film 40 together so as to fix them in place, and also made of an adhesive material. The lenticular lens sheet 20 and the front sheet 30 are bonded together by the first adhesive layer 35 and the front sheet 30 and the AR film 40 are bonded together by the second adhesive layer 36 such that air is evacuated from the interfaces. It should be noted that according to the present embodiment, the first and second adhesive layers have a layer thickness of 100 μm or less.

Fine particles working as a light diffusion material are spread throughout the first adhesive layer 35 disposed between the lenticular lens sheet 20 and the front sheet 30 and throughout the second adhesive layer 36 disposed between the front sheet 30 and the AR film 40. They have a light diffusion function to diffuse the projected light incident on the screen in the horizontal and vertical directions. Thus, the present embodiment bonds the lenticular lens sheet 20, the front sheet 30, and the AR film 40 together into a composite sheet by use of the first adhesive layer 35 and the second adhesive layer 36 so as to fix them in place. The distance between the first adhesive layer 35 and the second adhesive layer 36 is equal to the thickness of the front sheet 30 (approximately between 2 and 3 m).

Displaying a finer image on a transmissive screen requires reducing the lens pitch of the lenticular lenses, making it necessary to reduce the thickness of the lenticular lens sheet. This leads to a reduction in the mechanical strength. To enhance the mechanical strength of a thin lenticular lens sheet, conventionally the lenticular lens sheet and the front sheet are bonded together by use of adhesive, etc. According to the present embodiment, the first adhesive layer 35 and the second adhesive layer 36 each having a light diffusion function are used to bond the sheets into a composite sheet and thereby enhance the mechanical strength of the lenticular lens sheet 20. That is, the present embodiment uses the adhesive layers for forming the composite sheet as the light diffusion layers for diffusing light. Therefore, unlike conventional arrangements, no (additional) adhesive is need to form the composite sheet, and furthermore it is not necessary to newly laminate light diffusion layers. This provides a simple composite sheet configuration, resulting in reduced cost. Furthermore, according to the present embodiment, since it is not necessary to use any adhesive other than the first adhesive layer 35 and the second adhesive layer 36 having the light diffusion function, adhesive layers are not formed between the lenticular lens sheet 20, the front sheet 30, and the first and second adhesive layers 35 and 36, reducing the number of interfaces of the composite sheet. Therefore, the total reflection level from the interfaces can be reduced, preventing an increase in the reflection loss and a reduction in the contrast.

Examples of suitable materials for the fine particles used as the light diffusion material spread throughout each adhesive layer include inorganic materials such as silicon dioxide, alumina, powdered glass, calcium carbonate, mica, and limestone, and organic materials such as acrylic resin, polycarbonate resin, and fluorocarbon resin. A combination of one or more types of fine particles selected from among these suitable materials is used to produce a desired diffusion characteristic. The translucent resin used for the front sheet must be rigid and have a high light transmittance. Suitable translucent resins include acrylic resin (PMMA), "acrylic styrene copolymer resin" (MS resin), and polycarbonate resin.

In the transmissive screen of the present invention configured as described above, the projected light incident on the Fresnel lens sheet 10 is converted into substantially parallel beams by the Fresnel lens 11 and then focused by the lenticular lenses 21 onto the neighborhood of substantially planar portions on the light exit side of the lenticular lens sheet 20. The focused light is then diffused in the horizontal direction. The diffused light is passed through the front sheet 30 and the AR film 40 and projected to the viewer side. At that time, the light is diffused in both the horizontal and vertical directions by the first adhesive layer which is disposed adjacent to the light focusing portions of the lenticular lenses 21 and in which a light diffusion material is spread. The light is further diffused in the same manner by the second adhesive layer which is spaced from the first adhesive layer a distance equal to the thickness of the front sheet 30, thereby increasing the viewing angles in the horizontal and vertical directions.

Unlike the known example disclosed in Patent Document 1, the first and second adhesive layers 35 and 36, in which a light diffusion material is spread, are spaced a certain distance from each other, widening the light diffusion range. This results in increased diffusion effect, making it possible to reduce the above scintillation disturbance (described later in detail). Further according to the present invention, the Fresnel lens sheet 10 is not provided with any light diffusion layer, eliminating the vignetting (loss) of the light at the light shielding layer 22.

Further according to the present embodiment, the adhesive layers 35 and 36, in which a light diffusion material is spread, are disposed on a respective side of the front sheet 30. Therefore, it is possible to prevent a reduction in the resolution (blurring) even if the Fresnel lens sheet 10 and the composite sheet fixed to the screen frame expand or contract with ambient temperature or humidity. That is, when gaps are formed between the sheets due to the fact that the Fresnel lens sheet 10 and the composite sheet exhibit different magnitudes of expansion or contraction as the ambient temperature or humidity changes, the first adhesive layer 35 and the second adhesive layer 36 are deformed in the same manner as the front sheet 30. This means that even when the above expansion or contraction has occurred, the distance between the first adhesive layer 35 and the second adhesive layer 36 is the same at each position on the screen. Therefore, even when the above expansion or contraction has occurred, the distance between the light diffusion materials optimally spread in the first adhesive layer 35 and the second adhesive layer 36 remains substantially the same, reducing the possibility of the resolution of some portions of the screen being reduced. Further, unlike conventional approaches, the composite sheet of the present embodiment is formed such that a resin layer containing a light diffusion material is not laminated on the translucent resin substrate containing no light diffusion material. Therefore, the translucent resin substrate can be used as the front sheet as it is, which leads to reduced cost.

The scintillation disturbance will be described below. In FIG. 12 of the previously proposed Japanese Laid-Open Patent Publication No. 11-24169 (1999), the present applicant has disclosed the following equations:

$$\theta = 1/(F*M) \quad \text{(formula 1)}$$

$$D \approx \lambda * F * M \quad \text{(formula 2)},$$

where: $\theta$ denotes the visual angle from the screen (diffusion surface) to the pupil of the projection lens; D, the interference range within which the scintillation disturbance occurs; $\lambda$, the wavelength of the light; M, the magnification of the projection lens; and F, the f-number.

The above patent publication discloses that a light diffusion element may be added so as to increase the interference range D within which the scintillation disturbance occurs and thereby equalize the scintillation disturbance (spatial filter action), resulting in reduced scintillation disturbance.

Figure 3:
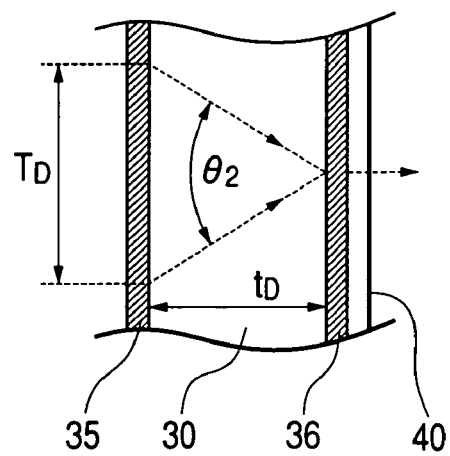
FIG. 3 is a diagram illustrating the light divergence effect of a second adhesive layer.

This technique can be applied to the present invention. FIG. 3 is a diagram illustrating the diffusion effect of the second adhesive layer. Referring to the figure, reference numeral $\theta_2$ denotes the half-value divergence angle of the light diffusion material spread in the second adhesive layer, $t_D$ denotes the thickness of the front sheet 30, and $T_D$ denotes the half-value light diffusion width of the second adhesive layer. As can be seen from FIG. 3, the half-value light diffusion width $T_D$ is expressed as:

$$T_D = 2*t_D*\text{Tan}(\theta_2/2) \approx t_D*\theta_2 \quad \text{(formula 3)}$$

The scintillation disturbance can be reduced if the above half-value light diffusion width $T_D$ is set larger than the interference range D expressed by formula 2, that is, if the width $T_D$ satisfies formula 4 below.

$$T_D = t_D * \theta_2 > D = \lambda * F * M \quad \text{(formula 4)}$$

The present invention adjusts or sets the amount of light diffusion material spread in the second adhesive layer 36 (that is, the half-value divergence angle $\theta_2$) as well as adjusting or setting the thickness $t_D$ of the front sheet 30 so as to satisfy formula 4 and thereby reduce the scintillation disturbance.

Figure 4:
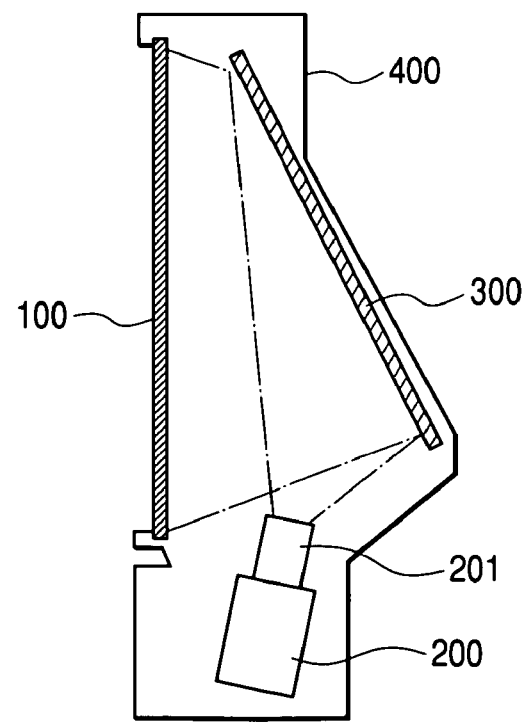
FIG. 4 is a diagram showing a rear projection type image display apparatus using a transmissive screen according to the present invention.

FIG. 4 is a diagram showing a rear projection type image display apparatus using a transmissive screen according to the present invention. In the figure, the rear projection type image display apparatus contains a projector 200 which includes display elements (not shown) for performing light intensity modulation to change the shade of light emitted from a light source (not shown) for each pixel according to an image signal, thereby forming an optical image. Examples of this type of display element include fixed pixel display devices such as transmissive and reflective liquid crystal panels and micro-mirror panels. The optical image on the display elements of the projector 200 is enlarged and projected by a projection lens 201 and then reflected by a rear side mirror 300 toward a transmissive screen 100. The optical image reflected from the rear side mirror 300 is projected onto the rear surface of the transmissive screen 100, thereby displaying an image on the viewer side of the transmissive screen 100. An enclosure 400 contains the projector 200, the projection lens 201, and the rear side mirror 300 and has the transmissive screen 100 fitted into its front side.

The projected image light incident on the transmissive screen 0.100 is converted into substantially parallel beams by the Fresnel lens sheet 10, as shown in FIG. 1, and diffused by the lenticular lens sheet 20 in the horizontal direction to increase the viewing angle in that direction. The diffused light is projected at the viewer side after it is further diffused in random directions by the light diffusion materials (fine particles) spread in the first adhesive layer 35 and the second adhesive layer 36 disposed on a respective side of the front sheet 30 to increase the viewing angles in both the horizontal and vertical directions.

Thus, the light diffusion materials for increasing the viewing angles of the transmissive screen 100 are spread in both adhesive layers 35 and 36 each disposed on a respective side of the front sheet 30 for protecting the transmissive screen, resulting in reduced cost, as compared with conventional arrangements in which a diffusion layer is laminated on the front sheet. This leads to a reduction in the cost of the rear projection type image display apparatus.

According to the present invention described above, since the adhesive layers for forming a composite sheet have a light diffusion function, no additional adhesive is need to bond the light diffusion layers, the lenticular lens sheet, and the front sheet together. With this arrangement, it is easy to form a composite sheet including light diffusion layers, resulting in reduced cost. Further, since no additional adhesive is used, the above composite sheet can be formed without increasing the number of interfaces. Therefore, there is no increase in the total reflection level from the interfaces, preventing an increase in the reflection loss and a reduction in the contrast and thereby providing high image quality. This effect is prominent when two or more diffusion layers are used to reduce the scintillation disturbance. Still further, the present invention prevents a reduction in the resolution due to changes in ambient temperature and humidity, making it possible to ensure high image quality even under changing ambient conditions. Still further, the present invention can provide a screen whose cost can be reduced.

What is claimed is:

1. A transmissive screen for receiving an image enlarged and projected from a display element, comprising:
    a lenticular lens sheet having a plurality of lenticular lenses formed on a light incident surface thereof, the lenticular lenses being arranged in a horizontal direction of said screen and which extend in a vertical direction of said screen;
    a front sheet disposed on a light exit side of said plurality of lenticular lenses;
    a first adhesive layer which bonds said lenticular lens sheet and said front sheet together, said first adhesive layer being disposed between said lenticular lens sheet and said front sheet; and
    a second adhesive layer which bonds with said front sheet, said second adhesive layer being disposed on a light exit side of said front sheet;
    wherein said first and said second adhesive layers include a light diffusion material for diffusing light to add a light diffusion function to the layers.

2. The transmissive screen as claimed in claim 1, further comprising an antireflective film, the antireflective film is disposed on a light exit side of said second adhesive layer, and said second adhesive layer bonds said front sheet and said antireflective film together.

3. The transmissive screen as claimed in claim 1, wherein:
    said display element performs light intensity modulation to change a shade of light from a light source for each pixel according to an image signal and thereby form an optical image; and
    said lenticular lens sheet includes light transmissive portions and light shielding layers, said light transmissive portions and light absorbing layers are arranged alternately on a light exit surface of said lenticular lens sheet in said horizontal direction of said screen, each light transmissive portion being disposed at a focal position of a respective one of said plurality of lenticular lenses, each light shielding layer being disposed at a position corresponding to a respective one of boundaries between said plurality of lenticular lenses.

4. A rear projection type image display apparatus using the transmissive screen as claimed in claim 1.

5. A transmissive screen used for a rear projection type image display apparatus, which includes:
    a light source;
    a display element which modulates light intensity to change a shade of light from said light source for each pixel according to an image signal and thereby form an optical image; and
    a projection lens which enlarges said optical image formed by said display element;
    wherein said optical image enlarged by said projection lens is projected to a rear surface of said transmissive screen;
    wherein said transmissive screen comprises:
    (a) a Fresnel lens sheet having a concentric Fresnel lens formed on a light exit surface thereof;
    (b) a lenticular lens sheet having a plurality of lenticular lenses formed on a light incident surface thereof and further having light transmissive portions and light absorbing layers arranged alternately on a light exit surface thereof in a horizontal direction of said screen, said plurality of lenticular lenses being arranged in said horizontal direction of said screen and extending in a vertical direction of said screen, each light transmissive portion being disposed at a focal position of a respective one of said plurality of lenticular lenses, each light shielding layer being disposed at a position corresponding to a respective one of boundaries between said plurality of lenticular lenses;

(c) a first adhesive layer in which is spread a light diffusion material for diffusing light;

(d) a front sheet; and (e) a second adhesive layer in which is spread a light diffusion material for diffusing light; and wherein said Fresnel lens sheet, said lenticular lens sheet, said first adhesive layer, said front sheet, and said second adhesive layer are arranged in that order in a traveling direction of said optical image.

6. The transmissive screen as claimed in claim 5, further comprising:

an antireflective film for reducing reflection of ambient light is disposed on a light exit side of said second light diffusion layer;

said first adhesive layer bonds said lenticular lens sheet and said front sheet together and said second adhesive layer bonds said front sheet and said antireflective film together so as to form a composite sheet made up of said lenticular lens sheet, said front sheet, and said antireflective film.

7. The transmissive screen as claimed in claim 6, wherein air is evacuated from bonding surfaces (interfaces) between said first adhesive layer and said light exit surface of said lenticular lens sheet, between said first adhesive layer and said front sheet, between said second adhesive layer and said front sheet, and between said second adhesive layer and said antireflective film.

8. The transmissive screen as claimed in claim 6, wherein said transmissive screen is configured to satisfy the expression:

$$T_D = t_D * \theta_2 > D = \lambda * F * M,$$

where: $\theta_2$ is the half-value light divergence angle of said second adhesive layer; $t_D$ is the thickness of said front sheet; $T_D$ is a light diffusion width given by the product $t_D * \theta_2$; F is the f-number of said projection lens; M is the magnification of said projection lens; $\lambda$ is the wavelength of light; and D is an interference range given by the product $\lambda * F * M$.

9. A rear projection type image display apparatus comprising:

a light source;

a display element which modulates light intensity to change a shade of light from said light source for each pixel according to an image signal and thereby form an optical image;

a projection lens which enlarges and projects said optical image formed by said display element;

a mirror which reflects said optical image projected from said projection lens; and a transmissive screen which receives on a rear surface thereof said optical image reflected from said mirror;

said transmissive screen including:

(a) a Fresnel lens sheet having a concentric Fresnel lens formed on a light exit surface thereof;

(b) a lenticular lens sheet having a plurality of lenticular lenses formed on a light incident surface thereof, and further having light transmissive portions and light absorbing layers arranged alternately on a light exit surface thereof in a horizontal direction of said screen, said plurality of lenticular lenses being arranged in said horizontal direction of said screen and extending in a vertical direction of said screen, each light transmissive portion being disposed at a focal position of a respective one of said plurality of lenticular lenses, each light shielding layer being disposed at a position corresponding to a respective one of boundaries between said plurality of lenticular lenses;

(c) a first light diffusion layer which is bonded to said light transmissive portions and said light shielding layer positioned on a light exit surface of said lenticular lens sheet and in which a light diffusion material for diffusing light is spread;

(d) a front sheet;

(e) a second light diffusion layer in which a light diffusion material for diffusing light is spread; and (f) an antireflective film for reducing reflection of ambient light;

wherein said Fresnel lens sheet, said lenticular lens sheet, said first light diffusion layer, said front sheet, said second light diffusion layer, and said antireflective film are arranged in that order in a traveling direction of said optical image; and wherein said lenticular lens sheet, said first light diffusion layer, said front sheet, said second light diffusion layer, and said antireflective film are bonded together into a composite sheet.

10. The rear projection type image display apparatus as claimed in claim 9, wherein:

said first and second light diffusion layers each include a base material having an adhesive property;

said first light diffusion layer is used as a first adhesive layer for bonding said lenticular lens sheet and said front sheet together; and said second light diffusion layer is used as a second adhesive layer for bonding said front sheet and said antireflective film together.

* * * * *